United States Patent [19]

Hoefer

[11] 4,284,309
[45] Aug. 18, 1981

[54] BRAKE CONTROL VALVE HAVING OPERATOR FEEDBACK

[75] Inventor: Wayne A. Hoefer, Blue Springs, Mo.

[73] Assignee: Caterpillar Tractor Co., Peoria, Ill.

[21] Appl. No.: 93,078

[22] PCT Filed: Aug. 13, 1979

[86] PCT No.: PCT/US79/00595

§ 371 Date: Aug. 13, 1979

§ 102(e) Date: Aug. 13, 1979

[87] PCT Pub. No.: WO81/00386

PCT Pub. Date: Feb. 19, 1981

[51] Int. Cl.³ .................... B60T 15/06; B60T 13/18
[52] U.S. Cl. ........................................ 303/50
[58] Field of Search ............... 60/548, 562; 303/6 M, 303/9, 10, 13, 50, 52, 54, 71

[56] References Cited

U.S. PATENT DOCUMENTS 2,450,275 6/1948 Eaton ................................. 303/54
3,227,494 1/1966 Alfieri ................................ 303/52

Primary Examiner—Duane A. Reger
Attorney, Agent, or Firm—Phillips, Moore, Weissenberger, Lempio & Majestic

[57] ABSTRACT

Conventional fluid control circuits for service brakes and the like do not always provide an operator with "pedal feel" to indicate the degree of brake engagement. Such "pedal feel" is particularly desirable in braking systems wherein the brakes thereof are spring-engaged and released by hydraulic fluid pressure. This invention provides a control valve (18) having an inlet (20), an outlet (21), a valve member (19) movable between closed and open position, and a first spring (30) for urging the valve member (19) toward its closed position. An operator input (36) is adapted to apply variable input force to the valve (18) to reduce the closing force of the first spring (30) and a second spring (33) is provided for applying a progressively increased opposing force to the operator's input force to provide the operator with "pedal feel" to indicate the degree of engagement of the brakes (15). A pair of passages (24,39) communicate the inlet (20) with opposite ends of the valve member (19) to aid in providing such "pedal feel."

17 Claims, 2 Drawing Figures

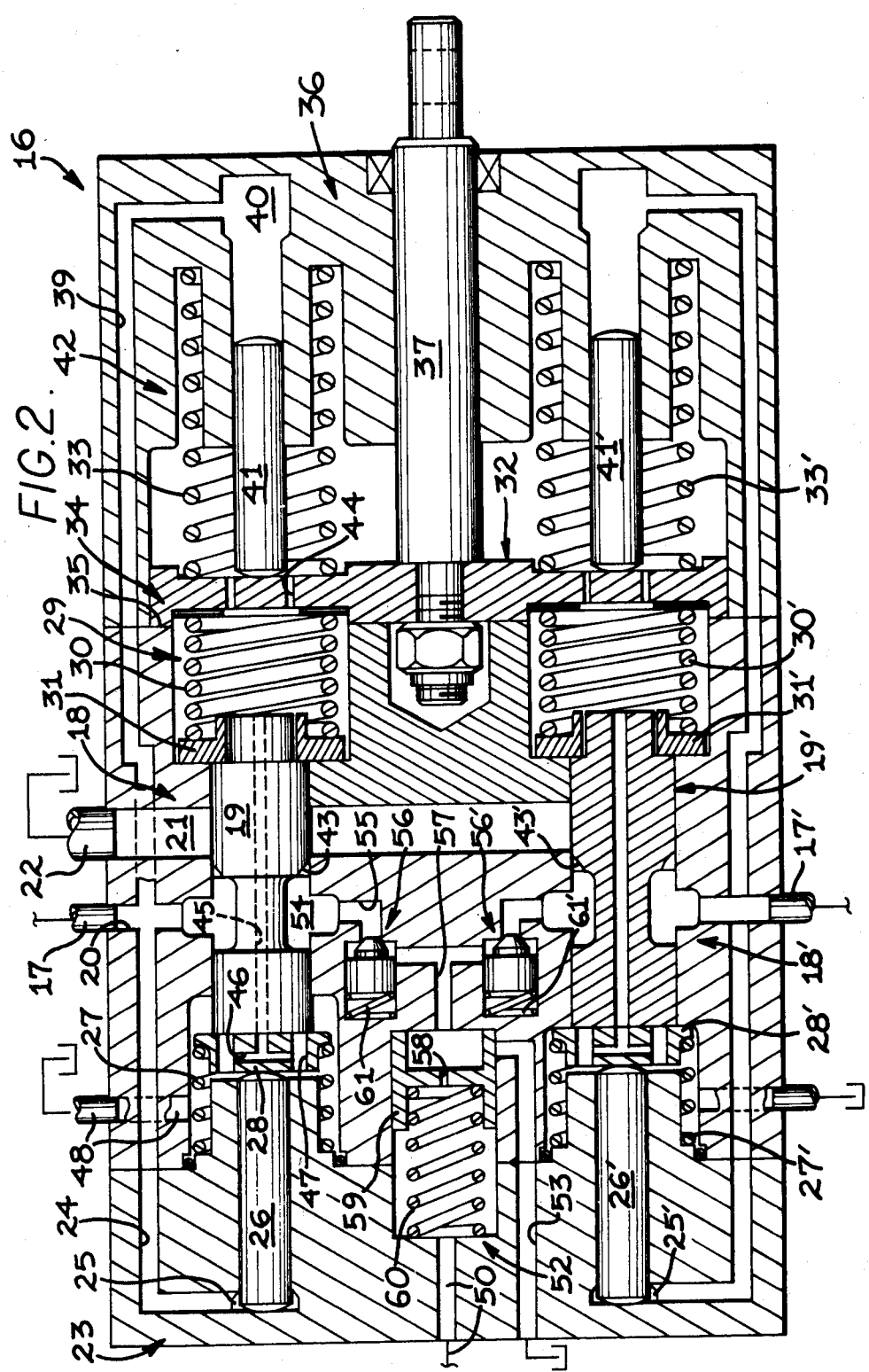

BRAKE CONTROL VALVE HAVING OPERATOR FEEDBACK

DESCRIPTION

1. Technical Field

This invention relates to a fluid control circuit including a control valve for selectively engaging a fluid-actuated coupling, such as a fluid disengaged brake, and means for providing an operator with a feedback indicating the degree of coupling engagement.

2. Background Art

Conventional fluid control circuits for selectively actuating service brakes employed on construction vehicles and the like normally include a directional control valve interconnected between an engine-driven pump and actuating chambers of the brakes. The brakes may be of the normally engaged type whereby the spring-engaged brakes are released upon venting of pressurized hydraulic fluid from the actuating chambers thereof.

Conventional braking systems of this type normally do not always provide the operator with the desired "pedal feel" or feedback to alert him regarding the degree of braking force being applied to the vehicle. One solution to this problem has been the provision of a plurality of compression coil springs having different spring rates, against which the operator applies his pedal effort or braking input. Although this type of braking system provides the operator with a certain degree of "pedal feel," it will be appreciated by those skilled in the art that such a system has drawbacks, including design considerations for precisely calibrating the springs for brake actuation purposes.

Another solution to the problem has been the provision of means for communicating pressurized fluid to an end of a spool of the control valve to provide a boost force thereto additive to the operator's input force. In addition, means are provided for venting such pressurized fluid upon opening of the valve whereby the spool solely reacts against the opposing force of a compression coil spring. The invention herein resides in an alternate solution to the above problem of providing an operator with the desired "pedal feel" to alert him regarding the degree of braking force being applied to a vehicle.

DISCLOSURE OF THE INVENTION

The present invention is directed to overcoming one or more of the problems as set forth above.

In one aspect of this invention, a fluid control circuit comprises a pump, a fluid-actuated coupling and a control valve, having an inlet and an outlet, for controlling communication of pressurized fluid to the coupling. The control valve includes first means for applying an opening force thereto, including first passage means for communicating fluid pressure from the inlet, and second means for applying a closing force to the valve. The improvement comprises third means for applying a variable input force to the valve to reduce the closing force of the second means, and fourth means for applying a progressively increased opposing force to the input force in response to actuation of the third means, including second passage means for communicating fluid pressure from the inlet to act on the valve.

In another aspect of this invention, the third means of the control valve includes a common plate, mounted between the second and fourth means.

The control valve and fluid control circuit of this invention are thus adapted to provide an operator with a closely calibrated and accurate "pedal feel" to indicate the degree of engagement of the coupling means, such as a service brake employed on a construction vehicle or the like.

BRIEF DESCRIPTION OF THE DRAWINGS

Other objects and advantages of this invention will become apparent from the following description and accompanying drawings wherein:

FIG. 2 is an enlarged sectional view, illustrating a bank of control valves employed in the fluid control circuit.

BEST MODE OF CARRYING OUT THE INVENTION

Figure 1:
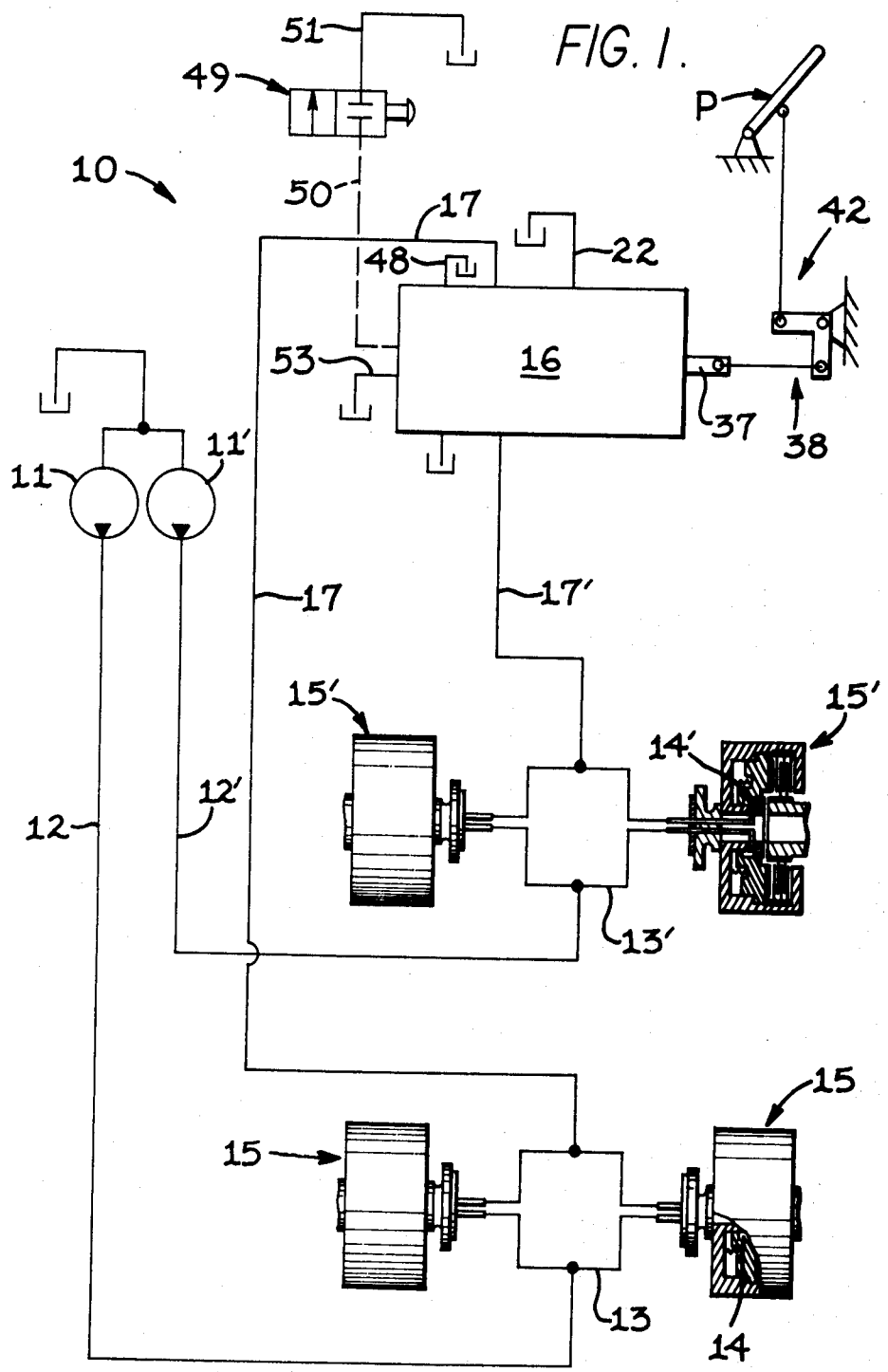
FIG. 1 schematically illustrates a fluid control circuit embodiment of the present invention for selectively actuating service brakes of a vehicle.

FIG. 1 schematically illustrates a fluid control circuit 10 comprising a pair of engine-driven pumps 11 and 11' for discharging pressurized fluid (hydraulic) therefrom in a conventional manner. A pair of lines 12 and 12' connect with lines 13 and 13', respectively, to communicate pressurized fluid to annular actuating chambers 14 and 14' of two sets of service brakes 15 and 15'. Although the invention herein described is particularly adapted for application to service brakes of this type, it will be appreciated by those skilled in the arts relating hereto that other types of applications can be made, such as the utilization of fluid actuated couplings (brakes or clutches) in a fluid control circuit for power shift transmissions or the like. In the illustrated application of this invention, brakes 15 and 15' are each preferably of the normally spring-engaged type and releasable by communicating pressurized fluid to actuating chambers 14 and 14' thereof.

When the engine is idling, pressurized fluid from pumps 11 and 11' is communicated through lines 13 and 13', through actuating chambers 14 and 14' of the brakes, and to a control valve 16, via lines 17 and 17'. As described more fully hereinafter, during this phase of engine operation, valve 16 will be conditioned to function as a pressure limiting valve with no operator input at an operator-controlled pedal P to permit continuous circulation of hydraulic fluid through circuit 10 to maintain the fluid in a warm and readied condition for efficient operation of valve 16 and brakes 15 and 15' will be maintained in their disengaged conditions of operation. As further described hereinafter, depression of pedal P during operation of the vehicle will function to closely modulate and control the desired engagement of brakes 15 and 15' and provide a feedback or "pedal feel," indicating to the operator the degree of brake engagement.

Referring to FIG. 2, control valve 16 comprises a pair of pressure modulating relief valves 18 and 18'. Whereas valve 18 controls the actuation of brakes 15, valve 18' controls the actuation of brakes 15'. Since valves 18 and 18' are substantial duplicates of each other, emphasis will be placed on describing the specific details of valve 18. Identical numerals depict corresponding construction of valve 18' with a prime (') symbol accompanying the latter numerals.

Valve 18 comprises a valve member or spool 19 reciprocally mounted in a housing of valve 16 for movement between its illustrated closed position, blocking communication between an inlet 20 connected to line 17 and outlet 21 connected to a vent line 22 communicating with a reservoir, and an open position communicating inlet 20 with outlet 21. An opening force is applied to spool 19 to urge it towards its open position by first means 23 including a branch passage 24 defined in the housing of valve 16 to interconnect inlet 20 with an actuating chamber 25 defined in the housing behind a piston 26. In addition, a relatively "light" compression coil spring 27 is disposed between an annular spring retainer 28 and the housing to also urge the spool from its illustrated closed position towards its open position.

Spring retainer 28 is disposed axially between a first end of spool 19 and an opposing end of piston 26 whereby pressurized fluid in chamber 25 will tend to move piston 26 and thus spool 19 rightwardly in FIG. 2. As suggested above, during idling of the engine, valve 18 will function as a pressure limiting valve to open slightly in response to fluid pressure communicated to chamber 25 from inlet 20 to continuously circulate hydraulic fluid through brake chambers 14 of brakes 15 to maintain the fluid in a warm and readied condition for efficient operation of the control circuit.

A closing force is applied to spool 19 to urge it leftwardly in FIG. 2 by second means 29, shown as including a second compression coil spring 30 mounted between a spring retainer 31, mounted on a second end of spool 19, and an annular plate 32. Second spring 30 preferably has an "intermediate" spring rate which is preferably greater than that of "light" spring 27, but less than the spring rate of a third relatively "heavy" compression coil spring 33. In the illustrated position of plate 32, spring 33 is fully expanded to engage the plate with a stop means 34 comprising an annular shoulder 35 defined in the housing of valve 16.

As described more fully hereinafter, a variable input force is applied to valve 18 to progressively reduce the closing force applied to spool 19 by spring 30 by third means 36, including plate 32, a rod 37 secured to the plate, and pedal P which is suitably connected to rod 37 via a linkage 38 (FIG. 1) to selectively move the rod rightwardly in FIG. 2 upon depression of pedal P. It can be further seen in FIG. 2 that rightward movement of rod 37 and plate 32 will move the plate against the opposing force of spring 33 whereby spring 30 will tend to relax.

A second branch passage 39 interconnects inlet 20 with a second actuating chamber 40, defined between the housing and an end of a second piston 41 which is adapted to engage plate 32 and apply a closing force thereon additive to the force of spring 33 when chamber 40 is pressurized. Spring 33 and chamber 40, when pressurized, may be considered to comprise fourth means 42 responsive to actuation of third or operator input means 36 for applying a progressively increased opposing force to the input force of the operator as applied to plate 32 to indicate the degree of engagement of brakes 15.

When the operator depresses pedal P to move plate 32 rightwardly in FIG. 2, pressurized fluid communicated to actuating chamber 25 from inlet 20 will function to move spool 19 rightwardly to communicate the inlet 20 with outlet 21 and thus vent line 22. Actuating chambers 14 of brakes 15 will thus be depressurized to engage the brakes. A plurality of modulating slots 43, formed on spool 19, will closely control depressurization of brake chambers 14 in proportion to the amount of depression of foot pedal P. As the amount of depression of foot pedal P increases, spring 33 will react against plate 32 and thus valve spool 19, through spring 30, to impose a proportionately increased force to the pool counteracting the input force of the operator. Such counteracting force will be supplemented by the force generated by any fluid pressure in chamber 40.

The operator will thus be provided with "pedal feel" indicating the degree of engagement of brakes 15. When spool 19 is moved rightwardly to communicate inlet 20 with outlet 21, it should be noted that fluid pressures in chambers 25 and 40 are also relieved. It should be further noted in FIG. 2 that the spring chambers defined in the housing of valve 16 are continuously vented via a plurality of ports 44 formed through plate 32, an elongated passage 45 formed through spool 19, a passage 46 and ports 47 formed in retainer 28, and a vent passage and line 48.

As indicated above, valve 18' is a substantial duplicate of valve 18 and thus the above description also applies thereto. It should be particularly noted that plate 32 is common to operation of valves 18 and 18' for controlling the engagement of brakes 15 and 15' substantially simultaneously. Outlet passage 21 is common to metering slots 43 and 43' of valves 18 and 18', respectively.

FIG. 1 further illustrates a two-position parking brake valve 49, shown in a closed position blocking communication of a pilot line 50, interconnected between valves 16 and 49, and movable to a second position communicating line 50 with a vent line 51. When the operator starts the vehicle and releases brakes 15 and 15' by shifting valve 49 to its illustrated closed or "brake-off" position, pilot line 50 will be isolated to prevent opening of a dump valve 52 as shown in FIG. 2. When valve 49 is moved rightwardly in FIG. 1 to its open or "brake-on" position, valve 52 will open to vent pressurized fluid from inlet 20 to a vent passage 53.

In particular, when valve 49 is in its FIG. 1, closed position, pressurized fluid at inlet 20 is communicated to valve 52 via a chamber 54, a passage 55, a check valve 56, and a passage 57. An orifice 58 is formed through a spool 59 of dump valve 52 to thus equalize the fluid pressure on either side of the dump valve, pilot line 50 having been isolated. The force of a compression coil spring 60 of valve 52 will thus maintain spool 59 in its closed position, blocking vent passage 53, as shown in FIG. 2.

When the operator desires to engage brakes 15 and 15' for parking purposes, valve 49 is shifted rightwardly in FIG. 1 to its open or "brake-on" position to vent pilot line 50 to vent line 51. As a result, a pressure drop will occur across orifice 58 of spool 59 to move the spool leftwardly against the opposed biasing force of spring 60 to uncover vent passage 53. The fluid pressures in inlet 20 and 20' and thus brake actuating chambers 14 and 14' are thus relieved to permit engagement of spring-biased brakes 15 and 15'.

In certain applications, it may prove desirable to engage all four brakes 15 and 15' for parking brake purposes. In such applications, springs 61 and 61' of check valves 56 and 56', respectively, may have the same spring rates to achieve this result. However, in certain other applications it may prove desirable to provide springs 61 and 61' with different spring rates and to only use brakes 15 for parking purposes, for example. In this latter application, a "heavier" spring 61' would be employed to prevent opening of check valve 56' whereby only check valve 56 would open and check valve 56' would remain closed upon shifting of valve 49 (FIG. 1) to its open position communicating pilot line 50 with vent line 51.

For example, brakes 15 may be employed in association with the tractor portion of a tractor-scraper whereas brakes 15' may be employed in association with the scraper portion thereof. Should only brakes 15 be equipped with means for cooling them by communicating hydraulic fluid thereto, it would thus prove desirable not to also employ brakes 15' as parking brakes to prevent undue wear thereof. In other braking applications it may prove desirable to further provide a retarder valve, also connected to pilot line 50, to selectively engage only brakes 15 of the tractor portion of the vehicle. Thus, the provision of a spring 61' which is stiffer than spring 61 would provide the desired selective engagement of only brakes 15 for retarding purposes during vehicle operation.

INDUSTRIAL APPLICABILITY

As described above, fluid control circuit 10 finds particular application in braking systems wherein it is desired to ensure that the operator is provided with a sense of "pedal feel" at pedal P to indicate the degree of braking force being applied to brakes 15 and 15'. In particular, increased foot resistance is felt by the operator on increased depression of pedal P to indicate that engagement of brakes 15 and 15' is also increasing. This desired "pedal feel" is particularly useful on construction vehicles, such as tractor-scrapers, wherein periodic and varied degrees of braking is required during earth moving operations.

Assuming that the vehicle is at rest with the engine running, shifting of parking brake valve 49 to its FIG. 1 closed position will condition control circuit 10 for vehicle operation. Should system pressures reflected in lines 17 and 17' exceed a predetermined maximum level, such as 2800 kPa (400 psi), the fluid pressure communicated to actuating chambers 25 and 25' of valves 18 and 18', respectively, will function to shift spools 19 and 19' thereof rightwardly to relieve the excess pressure through slots 43 and 43' and outlet passage 21. This pressure limiting and modulating function is controlled by the opposed force of intermediate spring 30, for example, which thus counteracts the combined forces imposed on spool 19 by the fluid pressure prevalent in chamber 25 and spring 27. During this phase of operation, wherein no operator input is applied to foot pedal P, spring 33 is fully expanded.

During operation of the vehicle, the operator will encounter situations wherein it will prove desirable to at least partially engage brakes 15 and 15'. The brakes, now acting as service brakes, may be progressively engaged by depressing pedal P to move rod 37 and plate 32 rightwardly in FIG. 2 against the opposed forces of spring 33 and any fluid pressure in chamber 40. Rightward movement of plate 32 will tend to relax spring 30, whereby spool 19 will shift rightwardly to effect a gradual reduction in the fluid pressure in line 17 as controlled by the gradual opening of metering slots 43. The gradual reduction of fluid pressure in line 17 will responsively effect a gradual engagement of brakes 15 by reducing the fluid pressure in the actuating chambers 14 thereof. As described above, rightward movement of plate 32 will simultaneously control the opening of metering slots 43' of valve 18' to reduce the fluid pressure in line 17' and actuating chambers 14' of brakes 15'.

Other aspects, objects and advantages of this invention can be obtained from a study of the drawings, the disclosure, and the appended claims.

I claim:

1. In a fluid control circuit (10) having pump means (11) for discharging pressurized fluid therefrom, fluid actuated coupling means (15) for being actuated upon communication of pressurized fluid to the actuating chamber (14) thereof from said pump means (11), said coupling means (15) having an actuating chamber (14), and valve means 18 for selectively venting pressurized fluid from the actuating chamber (14) of said coupling means (15) to control actuation thereof, said valve means (18) including an inlet (20) connected to said pump means (11), an outlet (21) connected to a reservoir, a valve member (19) movable between a closed position blocking communication between said inlet (20) and said outlet (21) and an open position communicating said inlet (20) with said outlet (21), first means (23) for applying an opening force to said valve member (19) to urge it towards its open position, including first passage means (24) for communicating fluid pressure from said inlet (20) to act on said valve member (24), and second means (29) for applying a closing force to said valve member (19) to urge it towards its closed position, the improvement comprising said valve means (18) further including third means (36) for applying a variable input force to said valve means (18) to reduce the closing force of said second means (29), and fourth means (42) for applying a progressively increased opposing force to said input force in response to actuation of said third means (36) to indicate the degree of engagement of said coupling means (15), including second passage means (39) for communicating fluid pressure from said inlet (20) to act on said valve member (24).

2. The control circuit of claim 1 wherein said coupling means (15) is normally engaged and is disengaged upon pressurization of the actuating chamber (14) thereof.

3. The control circuit of claim 2 wherein said coupling means (15) constitutes a brake.

4. The control circuit of claim 1 wherein said first means (23) includes actuating chamber means (25) for receiving pressurized fluid from said first passage means (24) and for moving said valve member (19) towards its open position in proportion to the level of fluid pressure prevalent in said actuating chamber means (25).

5. The control circuit of claim 4 further including a housing having said valve member (19) reciprocally mounted therein and wherein said first means (23) further includes biasing means (27) mounted between said housing and said spool member (19) for urging said spool member (19) towards its open position.

6. The control circuit of claim 1 or 4 wherein said second means (29) includes biasing means (30), mounted between an end of said valve member (19) and said third means (36), for reacting against said third means (36) to urge said valve member (19) towards its closed position.

7. The control circuit of claim 1 or 4 further including a housing and wherein said third means (36) includes a plate (32) reciprocally mounted in said housing and stop means (34) for limiting movement of said plate (32) towards said valve member (19), said second means (29) including a first biasing means (30) disposed between an end of said valve member (19) and said plate (32), for urging said valve member (19) towards its closed position and wherein said fourth means (42) includes a second biasing means (33) disposed between said plate (32) and said housing for urging said plate (32) into engagement with said stop means (34).

8. The control circuit of claim 1 wherein said third means (36) includes a reciprocal plate (32) disposed between said second means (29) and said fourth means (42) and pedal means (P) for selectively moving said plate (32) against said opposing force of said fourth means (42).

9. The control circuit of claim 1 further including a second said coupling means (15') for being selectively engaged upon communication of pressurized fluid to an actuating chamber (14') thereof and a second said valve means (18') for selectively venting pressurized fluid from the actuating chamber (14') of said second coupling means (15'), said outlet (21) being common to each of said first-mentioned valve means (18) and said second (18') valve means.

10. In a control valve (18) having an inlet (20), an outlet (21), a valve member (19) movable between a closed position blocking communication between said inlet (20) and said outlet (21) and an open position communicating said inlet (20) with said outlet (21), first biasing means (30) for urging said valve member (19) towards its closed position under a predetermined closing force, input means (36) for applying a variable input force to said valve member (19) to reduce the closing force of said first biasing means (30), and second biasing means (33) for applying a progressively increased opposing force to said input force in response to actuation of said input means (36), said input means (36) including a common plate (32) mounted axially between said first (30) and second (33) biasing means, the improvement comprising first (24) and second (39) passage means for communicating pressurized fluid from said inlet (20) to apply forces to opposite ends of said valve member (19) to urge it towards its open and closed positions, respectively.

11. The control valve of claim 10 further including actuating chamber means (25) for receiving pressurized fluid from said inlet (20) and for moving said valve member (19) towards its open position.

12. The control valve of claim 11 further including a housing having said valve member (19) and said plate (32) reciprocally mounted therein and further including third biasing means (27) mounted between said housing and said valve member (19) for urging said valve member (19) towards its open position.

13. The control valve of claim 10 or 11 wherein said first biasing means (30) is mounted between an end of said valve member (19) and said plate (32) for reacting against said plate (32) to urge said valve member (19) towards its closed position.

14. The control valve of claim 10 or 11 further including a housing and wherein said plate (32) is reciprocally mounted in said housing and stop means (34) for limiting movement of said plate (32) towards said valve member (19), said first biasing means (30) being disposed between an end of said valve member (19) and said plate (32) for urging said valve member (19) towards its closed position and wherein said second biasing means (33) is disposed between said plate (32) and said housing for urging said plate (32) into engagement with said stop means (34).

15. A control valve (18) comprising
an inlet (20),
an outlet (21),
a valve member (19) movable between a closed position blocking communication between said inlet (20) and said outlet (21) and an open position communicating said inlet (20) with said outlet (21),
first biasing means (30) for urging said valve member (19) towards its closed position under a predetermined closing force,
input means (36) for applying a variable input force to said valve member means (30),
second biasing means (33) for applying a progressively increased opposing force to said input force in response to actuation of said input means (36),
said input means (36) including a common plate (32) mounted axially between said first (30) and second (33) biasing means,
actuating chamber means (25) for receiving pressurized fluid from said inlet (20) and for moving said valve member (19) towards its open position,
a housing having said valve member (19) and said plate (32) reciprocally mounted therein, and
third biasing means (27) mounted between said housing and said valve member (19) for urging said valve member (19) towards its open position.

16. (New) A control valve (18) comprising
an inlet (20),
an outlet (21),
a valve member (19) movable between a closed position blocking communication between said inlet (20) and said outlet (21) and an open position communicating said inlet (20) with said outlet (21),
first biasing means (30) for urging said valve member (19) towards its closed position under a predetermined closing force,
input means (36) for applying a variable input force to said valve member (19) to reduce the closing force of said first biasing means (30),
second biasing means (33) for applying a progressively increased opposing force to said input force in response to actuation of said input means (36),
said input means (36) including a common plate (32) mounted axially between said first (30) and second (33) biasing means,
a housing, said plate (32) being reciprocally mounted in said housing, and
stop means (34) for limiting movement of said plate (32) towards said valve member (19),
said first biasing means (30) being disposed between an end of said valve member (19) and said plate (32) for urging said valve member (19) towards its closed position and wherein said second biasing means (33) is disposed between said plate (32) and said housing for urging said plate (32) into engagement with said stop means (34).

17. The control valve of claim 16 further including actuating chamber means (25) for receiving pressurized fluid from said inlet (20) and for moving said valve member (19) towards its open position.

* * * * *